United States Patent
Jeong

(10) Patent No.: US 8,187,742 B2
(45) Date of Patent: May 29, 2012

(54) RECHARGEABLE BATTERY

(75) Inventor: Dong-Ho Jeong, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1136 days.

(21) Appl. No.: 12/068,955

(22) Filed: Feb. 13, 2008

(65) Prior Publication Data

US 2008/0261108 A1    Oct. 23, 2008

(30) Foreign Application Priority Data

Apr. 20, 2007 (KR) ........................ 10-2007-0038843

(51) Int. Cl.
- H01M 2/22 (2006.01)
- H01M 2/26 (2006.01)
- H01M 2/02 (2006.01)
- H01M 2/04 (2006.01)
- H01M 6/10 (2006.01)

(52) U.S. Cl. .......... 429/161; 429/94; 429/163; 429/164; 429/176; 429/178

(58) Field of Classification Search ................. 429/163, 429/164, 152, 157, 76, 469, 94, 176, 211, 429/160, 407, 161, 178
See application file for complete search history.

(56) References Cited

U.S. PATENT DOCUMENTS

| | | | | |
|---|---|---|---|---|
| 3,393,095 A | * | 7/1968 | Philipp | 429/94 |
| 3,697,326 A | * | 10/1972 | Jammet | 429/407 |
| 3,761,314 A | * | 9/1973 | Cailley | 429/94 |
| 6,455,190 B1 | * | 9/2002 | Inoue et al. | 429/160 |
| 6,534,212 B1 | * | 3/2003 | Hooke | 429/94 |
| 2002/0034680 A1 | * | 3/2002 | Inoue et al. | 429/94 |
| 2003/0054240 A1 | * | 3/2003 | Aronsson | 429/157 |
| 2006/0024571 A1 | * | 2/2006 | Kim et al. | 429/161 |

FOREIGN PATENT DOCUMENTS

| | | | |
|---|---|---|---|
| CN | 1246734 A | | 3/2000 |
| CN | 1738093 A | | 2/2006 |
| JP | 63250049 A | * | 10/1988 |
| JP | 02281552 A | * | 11/1990 |
| JP | 11307076 | | 11/1999 |
| JP | 2005285514 | | 10/2005 |
| KR | 10-2005-0122682 | | 12/2005 |

OTHER PUBLICATIONS

Abstract of: JP 63250049 A, Yoshinaka et al., Oct. 1998.*
Abstract of: JP 02281552 A, Mitamura et al., Nov. 1990.*

* cited by examiner

*Primary Examiner* — Jonathan Crepeau
*Assistant Examiner* — Kenneth Douyette
(74) *Attorney, Agent, or Firm* — Robert E. Bushnell, Esq.

(57) ABSTRACT

A rechargeable battery that can stably fix an electrode assembly. The rechargeable battery is constructed with an electrode assembly that includes a cathode, an anode, and a separator interposed between the cathode and the anode, a case accommodating the electrode assembly and has a bottom boss formed at the bottom part, a cap assembly coupled with the case to close and seal the case and being electrically connected to the electrode assembly, and a current collecting plate disposed between the electrode assembly and the case and having an opening hole into which the bottom boss is inserted.

19 Claims, 8 Drawing Sheets

RECHARGEABLE BATTERY

CLAIM OF PRIORITY

This application makes reference to, incorporates the same herein, and claims all benefits accruing under 35 U.S.C. §119 from an application for RECHARGEABLE BATTERY earlier filed in the Korean Intellectual Property Office on 20 Apr. 2007 and there duly assigned Serial No. 10-2007-0038843.

BACKGROUND OF THE INVENTION

1. Field of the Invention

The present invention relates to a rechargeable battery. More particularly, the present invention relates to a rechargeable battery having an improved fixing structure for an electrode assembly of the rechargeable battery.

2. Description of the Related Art

Unlike a primary battery that is incapable of being recharged, a rechargeable battery is a battery that can be repeatedly charged and discharged. A low-capacity rechargeable battery having a single cell is used in small portable electronic apparatuses, such as mobile phones, laptop computers, and camcorders. A large-capacity rechargeable battery that includes a plurality of rechargeable cells connected in a pack shape is used as a power source for driving a motor of a hybrid electric vehicle and the like.

Rechargeable batteries are manufactured in various shapes, for example a cylindrical shape and a square shape.

Rechargeable batteries are connected in series so as to be used for driving a motor of an electric vehicle, which requires large power, thereby forming a large-capacity rechargeable battery module.

A rechargeable battery is typically constructed with an electrode assembly in which a cathode and an anode are disposed with a separator interposed between the cathode and the anode, a case accommodating the electrode assembly, and a cap assembly that closes and seals one base end of the case.

When the rechargeable battery has a cylindrical shape, regions where an active material is not coated are formed on the cathode and the anode of the electrode assembly. The uncoated cathode region and the uncoated anode region are disposed to be in opposite directions from each other.

An anode current collecting plate is attached to the uncoated anode region, and a cathode current collecting plate is attached to the uncoated cathode region. The anode current collecting plate is electrically connected to the case, and the cathode current collecting plate is electrically connected to the cap assembly, thereby leading a current to the outside. Accordingly, the case serves as an anode terminal, and a cap plate provided in the cap assembly serves as a cathode terminal.

The cathode current collecting plate and the cap assembly are electrically connected to each other by a lead member made from an electrically conductive metal. The cap assembly are welded to the lead member and then inserted into the case. After the cap assembly is inserted into the case, the cap assembly is clamped and fixed to the case.

In such a manner, the electrode assembly is electrically connected to the cathode current collecting plate and the anode current collecting plate. In order to maintain stable connection of the electrode assembly and the current collecting plates, the electrode assembly needs to be stably fixed within the case.

Since a space into which an electrolyte is accommodated is formed between the electrode assembly and the internal surface of the case, when an external impact is applied against the case, the electrode assembly may undesirably move within the case. In particular, when the rechargeable battery is applied to a moving apparatus such as a vehicle, or a vacuum cleaner, constant impacts are applied due to the use of the movable apparatus against the external environment, and thus the electrode assembly may freely move within the case.

When the electrode assembly freely moves within the case, defective contacts may occur in a contact portion of the electrode assembly and the current collecting plate. If a defective contact occurs between the electrode assembly and the current collecting plate, electrical resistance in the contact portion may increase, and the output of the rechargeable battery may deteriorate. Further, if the electrode assembly moves too much, the contact portion, may become separated, and thus charging and discharging may not be able to be performed.

The above information disclosed in this Background section is only for enhancement of understanding of the background of the invention and therefore it may contain information that does not form the prior art that is already known in this country to a person of ordinary skill in the art.

SUMMARY OF THE INVENTION

It is therefore an object of the present invention to provide an improved rechargeable battery.

It is another object to provide a rechargeable battery including a case and an anode current collecting plate capable of stably and immovably fixing an electrode assembly.

According to one aspect of the present invention, a rechargeable battery is constructed with an electrode assembly that includes a cathode, an anode, and a separator interposed between the cathode and the anode, a case accommodating the electrode assembly and having a bottom boss formed at a bottom part of the case and protruding to an inside of the case, a cap assembly coupled with the case to close and seal the case and being electrically connected to the electrode assembly, and a current collecting plate disposed between the electrode assembly and the case and having an opening into which the bottom boss is inserted.

The opening may be a recess receding to the inside of the case.

A fixing boss may be formed on a surface of the current collecting plate that is opposite to the opening so as to be inserted into the center of the electrode assembly.

A center pin may be inserted into the center of the electrode assembly.

The fixing boss may be inserted into the center pin.

The opening may be a through hole, and the bottom boss may protrude above the through hole.

A bottom recess may be formed on a surface of the bottom part of the case that is opposite to the bottom boss.

The cap assembly may have a cap plate that is provided with an electrode terminal, and a support boss may be formed in the cap plate so as to be inserted into a bottom recess of an adjacent rechargeable battery.

The bottom boss may have a solid structure.

The case may have a cylindrical shape.

The fixing boss may have a cylindrical shape.

According to another aspect of the present invention, a rechargeable battery is constructed with an electrode assembly that includes a cathode, an anode, and a separator interposed between the cathode and the anode, a case accommodating the electrode assembly, a cap assembly coupled with the case to close and seal the case and being electrically connected to the electrode assembly, and a current collecting plate disposed between the electrode assembly and the case and having fixing boss that is inserted into the center of the electrode assembly.

The fixing boss may have a rib shape with a rib formed around a circumferential surface of the fixing boss.

The fixing boss may have a solid structure.

The fixing boss may have a cylindrical shape.

A welding recess may be formed at the center of the fixing boss.

A center pin may be inserted into the center of the electrode assembly, and the fixing boss may be inserted into the center pin.

The current collecting plate may be formed such that an external circumferential surface thereof comes into contact with an internal circumferential surface of the case.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

The present invention is described more fully hereinafter with reference to the accompanying drawings, in which embodiments of the present invention are shown. These embodiments are provided so that this disclosure is thorough and will fully convey the scope of the invention to those skilled in the art. The present invention may, however, be embodied in many different forms and should not be construed as limited to the embodiments set forth herein.

Figure 1:
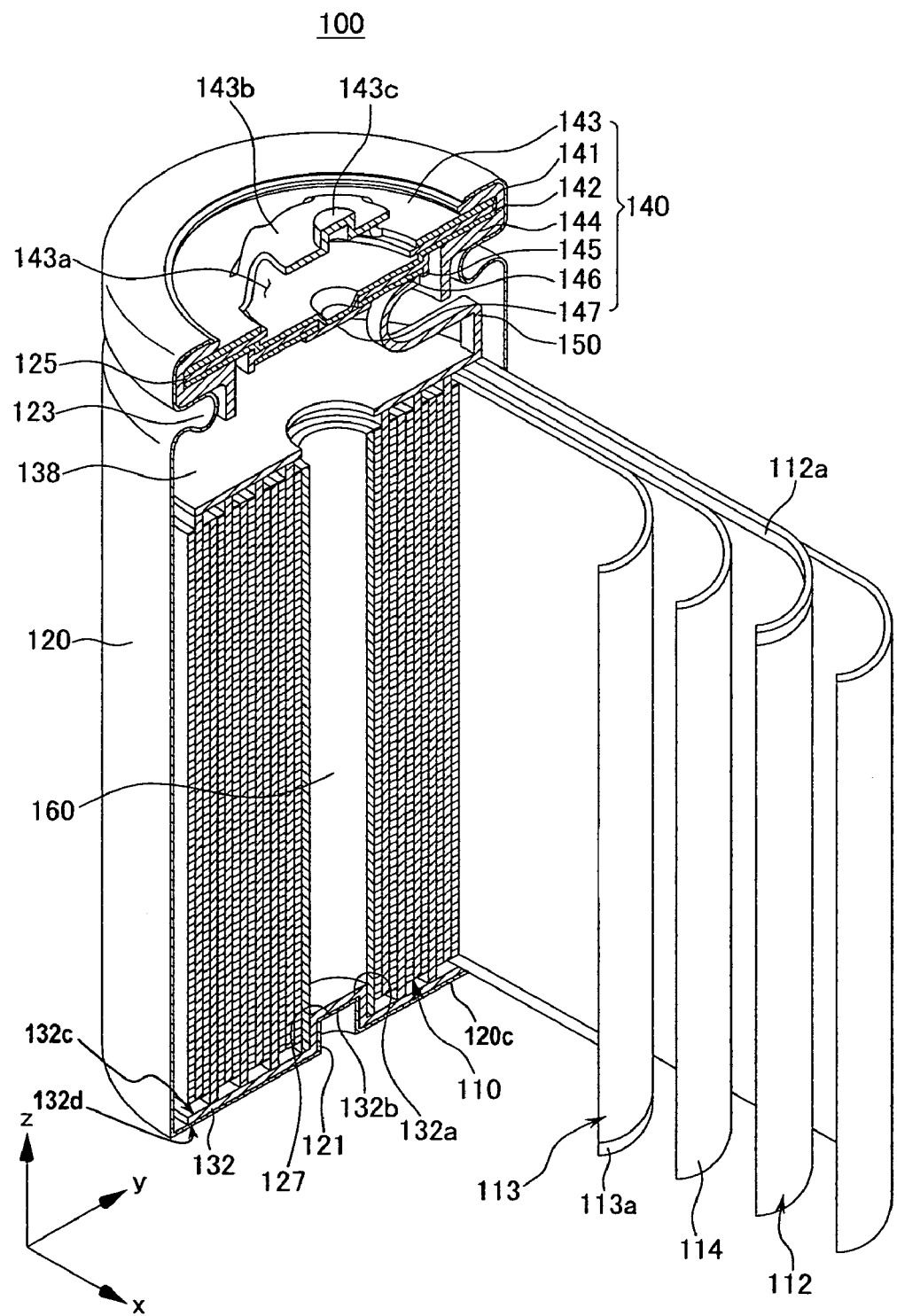
FIG. 1 is a cross-sectional oblique view showing a rechargeable battery constructed as a first exemplary embodiment of the principles of the present invention.

FIG. 1 is a cross-sectional oblique view showing a rechargeable battery constructed as a first exemplary embodiment according to the principles of the present invention.

Referring to FIG. 1, a rechargeable battery 100 according to the first exemplary embodiment is constructed with an electrode assembly 110 that includes a cathode 112 and an anode 113 with a separator 114 interposed between cathode 112 and anode 113, and a case 120 that has an opening at one base end so as to accommodate the insertion of electrode assembly 110 together with an electrolyte (not shown). A cap assembly 140 is provided on the opening of case 120 through a gasket 144 to seal case 120.

Specifically, case 120 is made from an electrically conductive metal, such as steel plated with aluminum, an aluminum alloy, or nickel.

Case 120 according to the first exemplary embodiment has a cylindrical shape having an internal space, in which electrode assembly 110 is disposed. After electrode assembly 110 is inserted into case 120, cap assembly 140 is clamped and fixed to case 120. At this time, an indented bead portion 123 and a crimped clamping portion 125 are formed around the circumferential periphery of case 120.

In electrode assembly 110 according to the first exemplary embodiment, cathode 112, separator 114, and anode 113 are laminated and wound in a vortex shape, thereby forming a cylindrical shape. Electrode assembly 110 is not limited to this structure, and electrode assembly 110 may have a different structure. An axially extending space is formed at the center of electrode assembly 110, and a center pin 160 is provided in the space such that electrode assembly 110 maintains the cylindrical shape.

An uncoated cathode region 112a where a cathode active material is not coated is formed at an upper end of cathode 112 (on the basis of the z axis in FIG. 1) so as to be electrically connected to a cathode current collecting plate 138. Further, an uncoated anode region 113a where an anode active material is not coated is formed at a lower end of anode 113 (on the basis of the z axis in FIG. 1) so as to be electrically connected to an anode current collecting plate 132.

Cap assembly 140 is constructed with a cap plate 143 that includes a protruding external terminal 143b and an exhaust port 143a, and a vent plate 142 that is provided below cap plate 143 and breaks under a selected pressure condition to emit gas. When vent plate 142 breaks under the selected pressure condition, vent plate 142 blocks an electrical connection between electrode assembly 110 and cap plate 143.

A positive temperature coefficient element 141 is provided between cap plate 143 and vent plate 142. Positive temperature coefficient element 141 is an element that is fabricated to have an infinite large electrical resistance above a selected temperature. When the temperature of rechargeable battery 100 becomes a selected value or more, positive temperature coefficient element 141 blocks the flow of charging and discharging current between cap plate 143 and vent 11 plate 142.

Vent plate 142 protrudes downward, and a sub-plate 147 is attached to a lower surface of protruding portion of vent plate 142.

A middle plate 146 that is fixed to sub-plate 147 is provided at an edge of vent plate 142. Further, an insulator 145 is provided between middle plate 146 and vent plate 142 to electrically insulate middle plate 146 from vent plate 142. Sub-plate 147 is electrically connected to electrode assembly 110 through lead portion 150.

A bottom boss 127 of case 120 is formed at a bottom part 120c of case 120 to protrude upward and toward the inside of case 120 (in the z-axis direction). A concave forms a fixing recess 132b of anode current collecting plate 132, into which bottom boss 127 is inserted, on a lower surface 132d of anode current collecting plate 132 facing case 120.

Bottom boss 127 of case 120 has a cylindrical shape, and fixing recess 132b of anode current collecting plate 132 has a shape corresponding to bottom boss 127 such that bottom boss 127 can be inserted into fixing recess 132b.

Accordingly, anode current collecting plate 132 can be stably fixed to case 120. Therefore, defective contact with electrode assembly 110 can be prevented when anode current collecting plate 132 freely moves within case 120.

Figure 2:
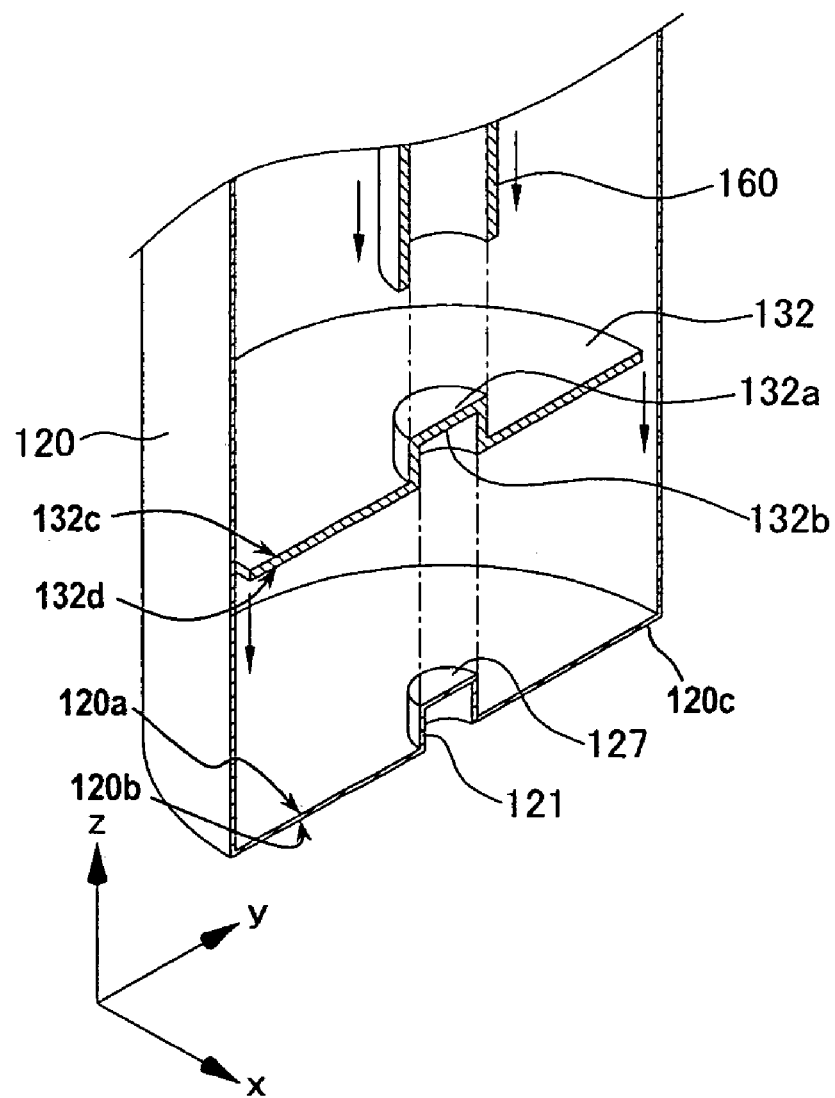
FIG. 2 is an exploded oblique view showing a part of the rechargeable battery constructed as the first exemplary embodiment of the principles of the present invention.

As shown in FIG. 2, anode current collecting plate 132 is depressed to form fixing recess 132*b*. Then, fixing boss 132*a* that protrudes upward is formed on an upper surface 132*c* opposite to fixing recess 132*b*. Accordingly, fixing recess 132*b* has a hollow structure having an opening facing downward.

As shown in FIG. 1, fixing boss 132*a* protrudes upward and is then inserted into the center of electrode assembly 110. As a result, anode current collecting plate 132 that is fixed to case 120 can stably support electrode assembly 110. With this structure, electrode assembly 110 is stably fixed to case 120 without freely moving within case 120.

Meanwhile, center pin 160 is inserted into the center of electrode assembly 110, and fixing boss 132*a* is inserted into center pin 160. That is, fixing boss 132*a* is inserted into the center of electrode assembly 110 through center pin 160.

In a contemporary rechargeable battery, a hard support structure does not exist at the center of the electrode assembly. Therefore, even if a fixing boss of the case supports the lower portion of the electrode assembly, the upper portion of the electrode assembly may not be stably fixed.

In contrast, according to the principles of the first exemplary embodiment, center pin 160 is inserted into the center of electrode assembly 110 and fixing boss 132*a* is then inserted into center pin 160. Accordingly, center pin 160 that is fixed to fixing boss 132*a* can stably support entire electrode assembly 110.

In addition, bottom boss 127 is formed on an upper surface 120*a* of bottom part 120*c* of case 120 and protrudes upwardly. Then, a bottom recess 121 is formed on a lower surface 120*b* opposite to bottom boss 127. As shown in FIG. 1, a support boss 143*c* is formed in cap plate 143 so as to be inserted into a bottom recess of a different rechargeable battery disposed above rechargeable battery 100, on which terminal 143*b* is formed.

Figure 3:
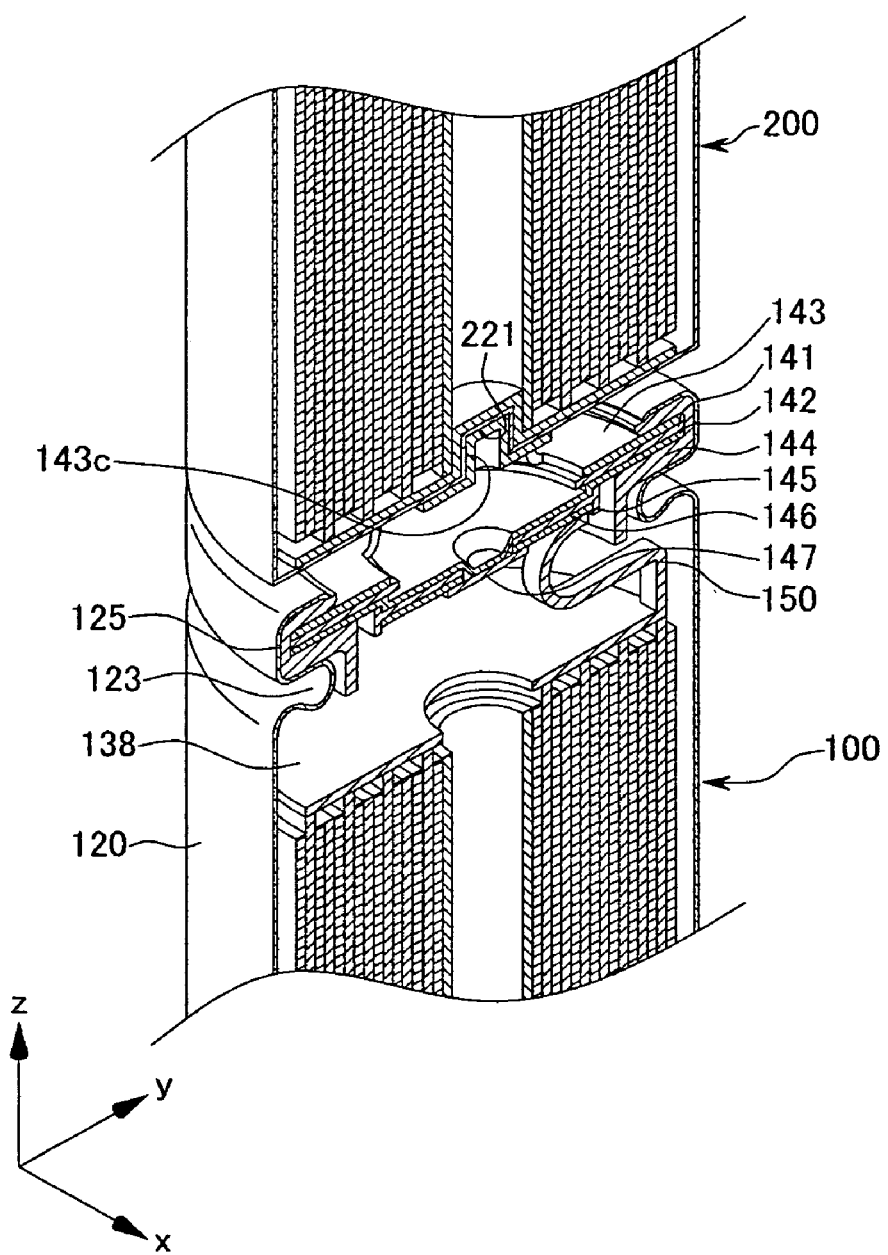
FIG. 3 is a cross-sectional oblique view showing a state where a pair of rechargeable batteries constructed as the first exemplary embodiment of the principles of the present invention are coupled with each other.

As shown in FIG. 3, when rechargeable batteries 100 and 200 are arranged in series, support boss 143*c* allows rechargeable battery 100 to be stably coupled with adjacent rechargeable battery 200. Accordingly, when rechargeable batteries 100 and 200 are arranged in series, rechargeable batteries 100 and 200 are aligned only by inserting support boss 143*c* into bottom recess 221 of the adjacent rechargeable battery 200.

Figure 4:
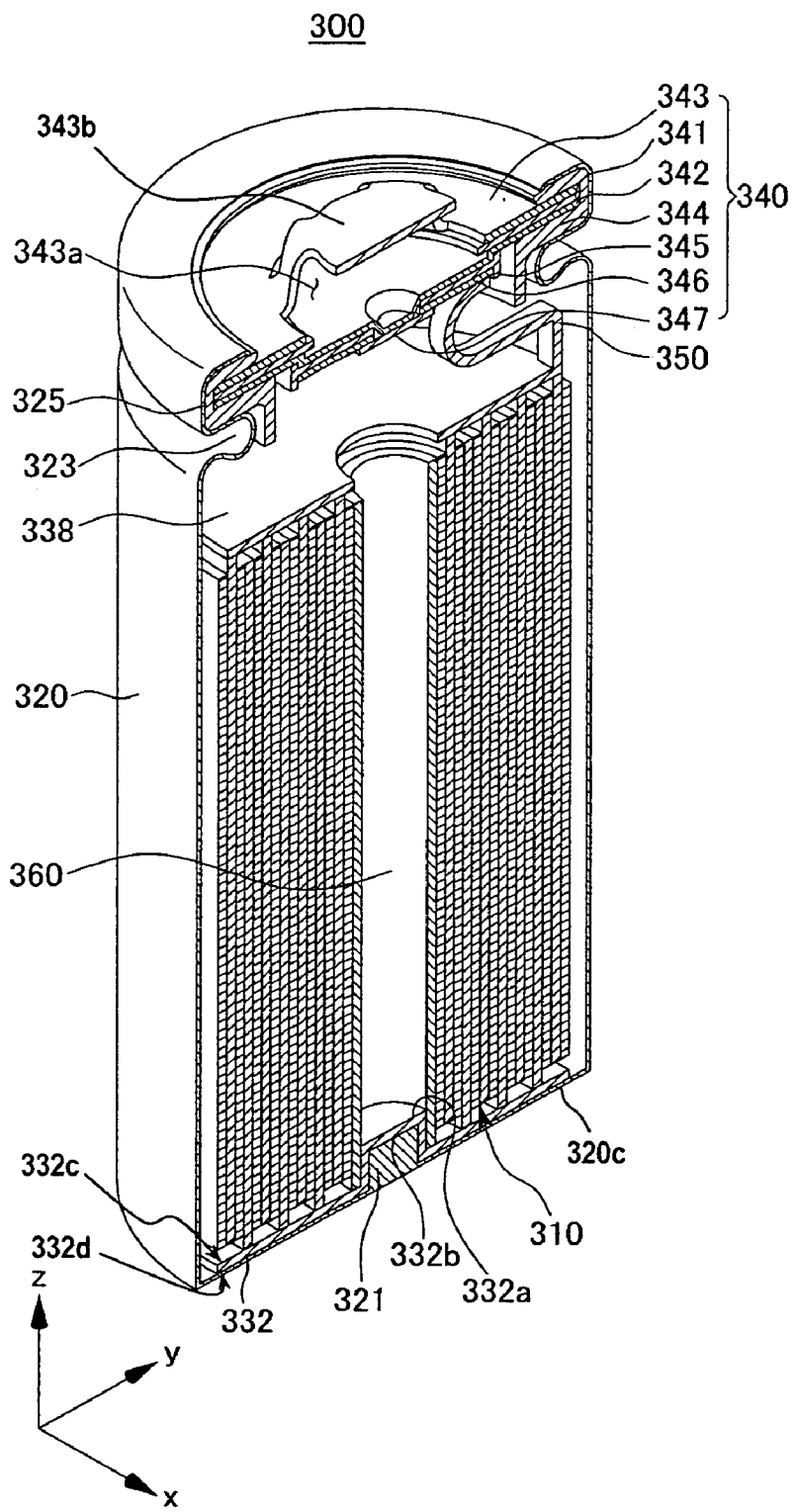
FIG. 4 is a cross-sectional oblique view showing a rechargeable battery constructed as a second exemplary embodiment of the principles of the present invention.

FIG. 4 is a cross-sectional oblique view showing a rechargeable battery constructed as a second exemplary embodiment according to the principles of the present invention.

Referring to FIG. 4, a rechargeable battery 300 according to the second exemplary embodiment is constructed with an electrode assembly 310, a case 320 that accommodates electrode assembly 310, and a cap assembly 340 that closes and seals case 320. A center pin 360 is provided at the center of electrode assembly 310 such that electrode assembly 310 maintains a cylindrical shape.

A cathode current collecting plate 338 is provided at an upper end of electrode assembly 310 to be electrically connected to electrode assembly 310. Further, an anode current collecting plate 332 is provided at a lower end of electrode assembly 310 to be electrically connected to electrode assembly 310.

Cap assembly 340 is constructed with a cap plate 343 that includes a protruding external terminal 343*b* and an exhaust port 343*a*, and a vent plate 342 that is provided below cap plate 343 and breaks under a selected pressure condition to emit gas. A positive temperature coefficient element 341 is provided between cap plate 343 and vent plate 342.

Vent plate 342 protrudes downward, and a sub-plate 347 is attached to a lower surface of the protruding portion of vent plate 342. A middle plate 346 is provided at an edge of vent plate 342 to be electrically connected to electrode assembly 310 through a lead portion 350 and fixed to sub-plate 347. An insulator 345 is provided between middle plate 346 and vent plate 342 to electrically insulate middle plate 346 from vent plate 342.

A bottom boss 321 of case 320 is formed at bottom part 320*c* of case 320 to protrude upwardly toward the inside of case 320. Bottom boss 321 according to the second exemplary embodiment has a solid structure.

A fixing recess 332*a* of anode current collecting plate 332, into which bottom boss 321 is inserted, is formed on a lower surface 332*d* of anode current collecting plate 332 facing case 320. Accordingly, bottom boss 321 is inserted into anode current collecting plate 332, such that anode current collecting plate 332 can be stably fixed to case 320.

Anode current collecting plate 332 is depressed to form fixing recess 332*a*. Then, a fixing boss 332*b* that protrudes upward (in the z-axis direction of FIG. 4) is formed on an upper surface 332*c* opposite to fixing recess 332*a*.

Fixing boss 332*b* is inserted into center pin 360, such that anode current collecting plate 332 stably fixes electrode assembly 310 through center pin 360.

Figure 5:
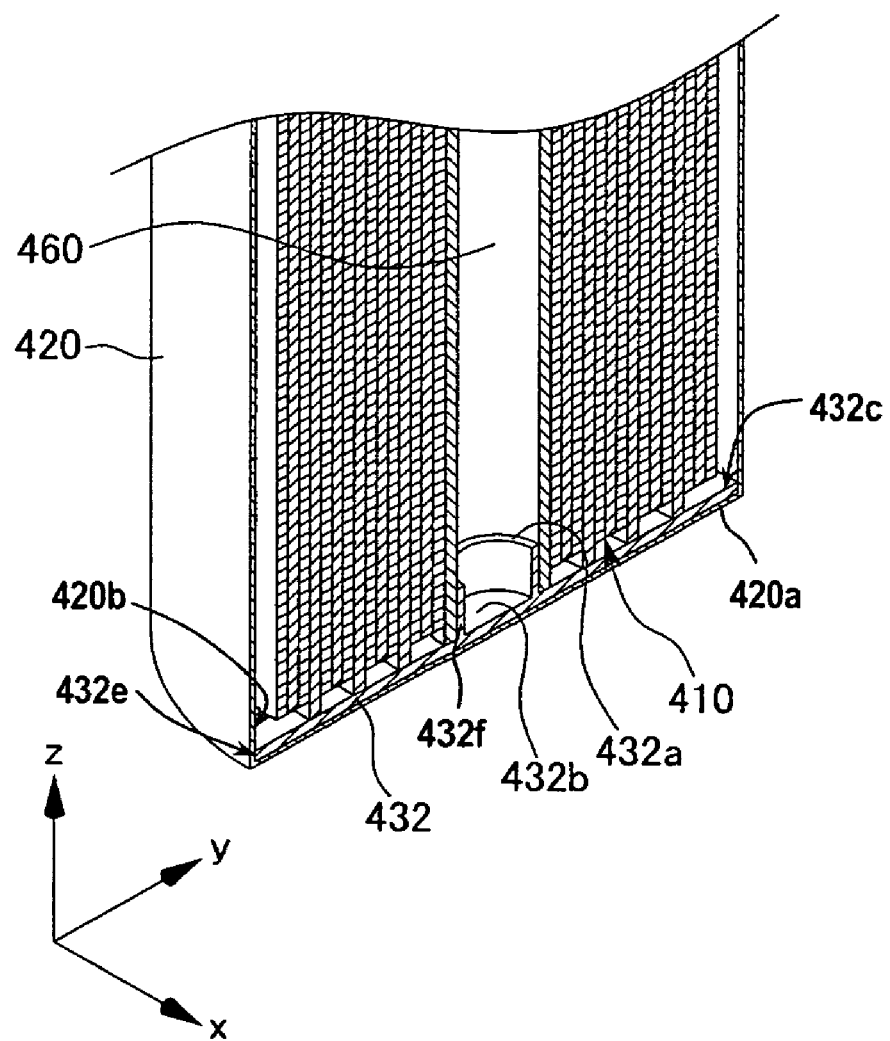
FIG. 5 is a cross-sectional oblique view showing a part of a rechargeable battery constructed as a third exemplary embodiment of the principles of the present invention.

FIG. 5 is a cross-sectional oblique view showing a part of a rechargeable battery constructed as a third exemplary embodiment according to the principles of the present invention. A rechargeable battery constructed as the third exemplary embodiment has the same structure as the rechargeable battery constructed as the first exemplary embodiment, except the bottom structure of case 420 and the structure of anode current collecting plate 432. The same parts as those in the first exemplary embodiment are represented by the same reference numerals, and the descriptions thereof will be omitted.

Case 420 has a cylindrical shape, and bottom 420*a* of case 420 is flat. Anode current collecting plate 432 has a shape corresponding to the transverse sectional shape of case 420. Specifically, anode current collecting plate 432 is formed such that an external circumferential surface 432*e* of anode current collecting plate 432 comes into contact with an internal circumferential surface 420*b* of case 420.

Accordingly, anode current collecting plate 432 comes into close contact with internal circumferential surface 420*b* of case 420. Therefore, anode current collecting plate 432 can be stably fixed to case 420 without freely moving within case 420.

Meanwhile, a fixing boss 432*a* of anode current collecting plate 432 is formed at the center of upper surface 432*c* of anode current collecting plate 432 facing electrode assembly 410. Fixing boss 432*a* has a cylindrical shape and is inserted into the center of electrode assembly 410. Fixing boss 432*a* is formed with rib 432*f* defining the outer surface of the cylindrical shape.

Fixing boss 432*a* according to the third exemplary embodiment has a circular transverse sectional shape. Accordingly, fixing boss 432*a* has a hollow cylindrical structure, and a welding recess 432*b* is formed at the center of fixing boss 432*a*.

Anode current collecting plate 432 is welded with electrode assembly 410 and then inserted into case 420. A welding electrode (not shown), that is, an electrode for the welder used in the welding process, is provided on an external bottom surface of case 420. After another welding electrode (not shown) is inserted into the center of electrode assembly 410, anode current collecting plate 432 is fixed to case 420 by resistive welding or the like. Accordingly, according to the third exemplary embodiment, where rib-shaped fixing boss 432a is formed in anode current collecting plate 432, and welding recess 432b is formed at the center of fixing boss 432a, even if fixing boss 432a is formed, another welding electrode can be inserted into welding recess 432b.

Fixing boss 432a is inserted into a center pin 460, such that anode current collecting plate 432 is inserted into the center of electrode assembly 410 through center pin 460. Accordingly, anode current collecting plate 432 can stably fix electrode assembly 410 using fixing boss 432a.

Figure 6:
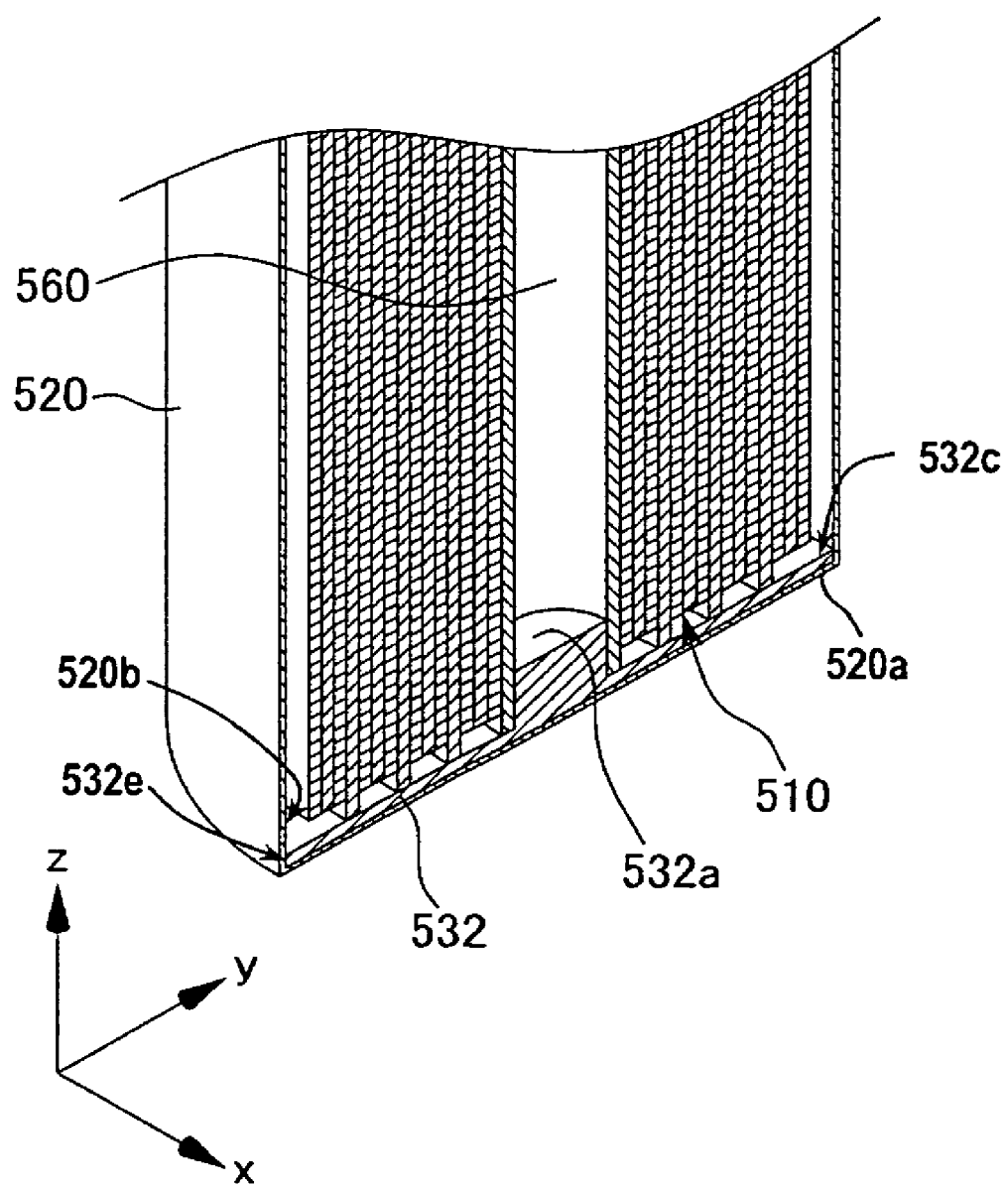
FIG. 6 is a cross-sectional oblique view showing a part of a rechargeable battery constructed as a fourth exemplary embodiment of the principles of the present invention.

FIG. 6 is a cross-sectional oblique view showing a part of a rechargeable battery constructed as a fourth exemplary embodiment according to the principles of the present invention. A rechargeable battery constructed as the fourth exemplary embodiment has the same structure as the rechargeable battery constructed as the first exemplary embodiment, except the bottom structure of case 520 and the structure of anode current collecting plate 532. The same parts as those in the first exemplary embodiment are represented by the same reference numerals, and the descriptions thereof will be omitted.

Case 520 has a cylindrical shape, and bottom 520a of case 520 is flat. Anode current collecting plate 532 has a shape corresponding to the transverse sectional shape of case 520. Specifically, anode current collecting plate 532 is formed such that an external circumferential 11 surface 532e of anode current collecting plate 532 comes into contact with an internal circumferential surface 520b of case 520.

Accordingly, since anode current collecting plate 532 comes into close contact with internal circumferential surface 520b of case 520, anode current collecting plate 532 can be stably fixed to case 520 without freely moving within case 520.

Meanwhile, a fixing boss 532a is formed at the center of an upper surface 532c of anode current collecting plate 532 facing an electrode assembly 510. Fixing boss 532a has a cylindrical shape and is inserted into the center of electrode assembly 510.

Fixing boss 532a according to the fourth exemplary embodiment has a solid structure, and the transverse sectional shape thereof is circular. Fixing boss 532a is inserted into a center pin 560, such that anode current collecting plate 532 is inserted into the center of electrode assembly 510 through center pin 560. Accordingly, anode current collecting plate 532 stably fixes electrode assembly 510 using fixing boss 532a.

Figure 7:
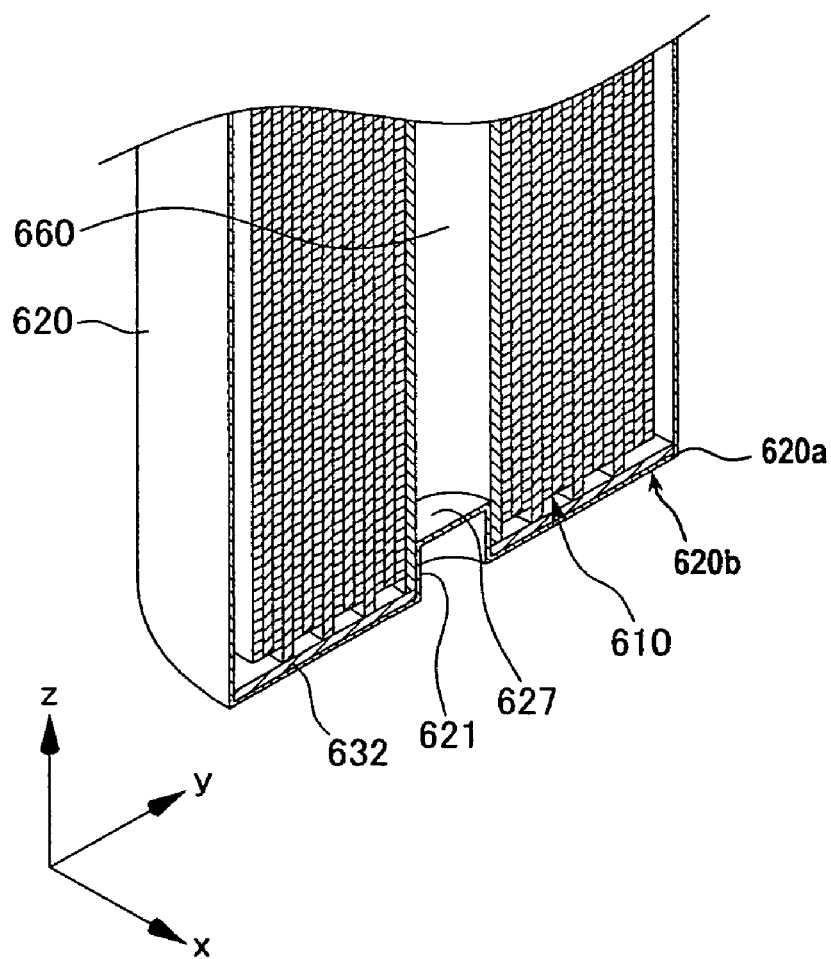
FIG. 7 is a cross-sectional oblique view showing a part of a rechargeable battery constructed as a fifth exemplary embodiment of the principles of the present invention.
Figure 8:
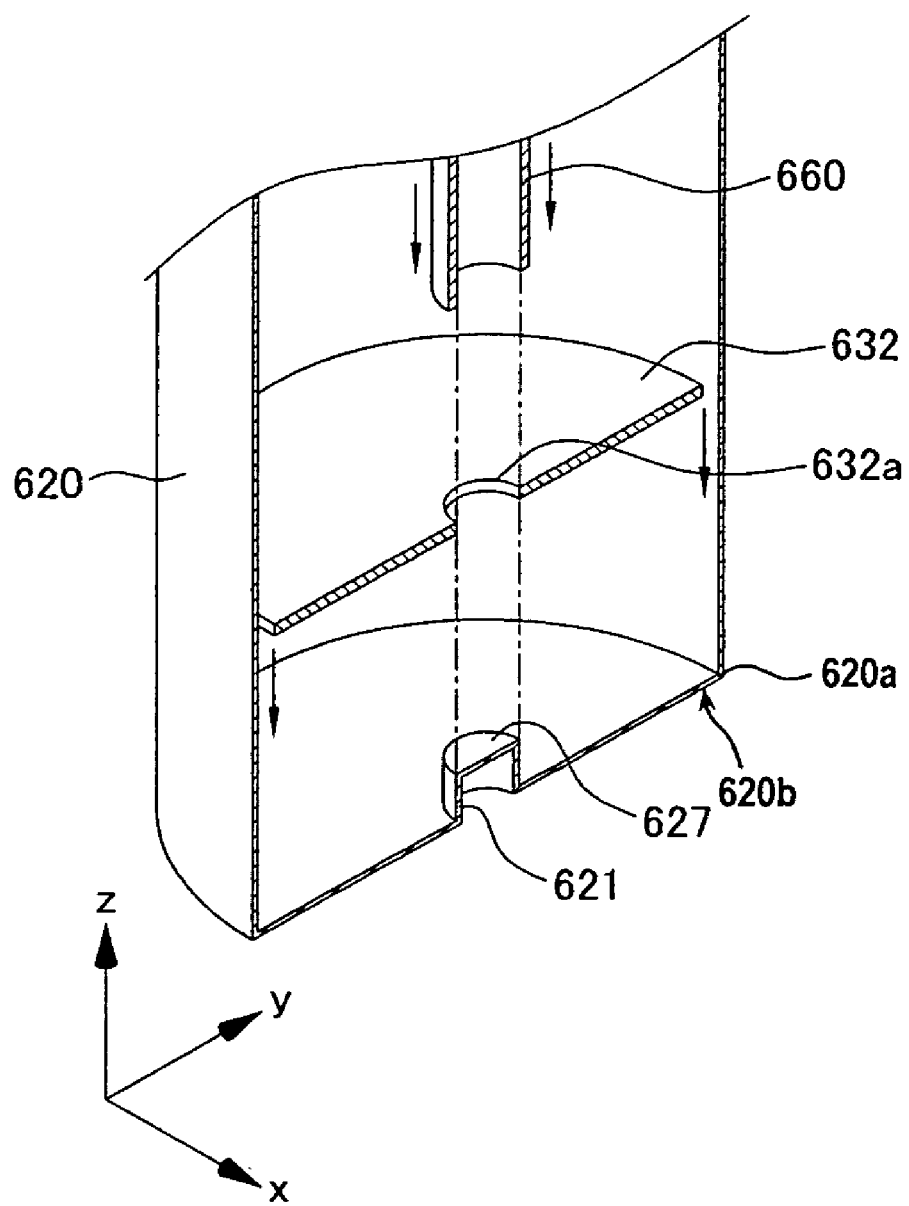
FIG. 8 is an exploded oblique view showing a part of the rechargeable battery constructed as the fifth exemplary embodiment of the principles of the present invention.

FIG. 7 is a cross-sectional oblique view showing a part of a rechargeable battery constructed as a fifth exemplary embodiment according to the principles of the present invention, and FIG. 8 is an exploded oblique view showing a part of the rechargeable battery constructed as the fifth exemplary embodiment of the present invention.

A rechargeable battery constructed as the fifth exemplary embodiment has the same structure as the rechargeable battery constructed as the first exemplary embodiment, except the structure of an anode current collecting plate 632. The same parts as those in the first exemplary embodiment are represented by the same reference numerals, and the descriptions thereof will be omitted.

A case 620 has a cylindrical shape, and a bottom boss 627 is formed in bottom part 620 of case 620 to protrude upward and toward the inside of case 620 (in the z-axis direction). Bottom boss 627 protrudes to the inside of case 620. Then, a bottom recess 621 is formed on a lower surface 620b opposite to bottom boss 627.

As shown in FIG. 8, a through hole 632a, into which bottom boss 627 is inserted, is formed in anode current collecting plate 632. Bottom boss 627 has a cylindrical shape, and through hole 632a has a circular sectional shape such that bottom boss 627 can be inserted into through hole 632a.

Accordingly, anode current collecting plate 632 can be stably fixed to case 620, and defective contact with electrode assembly 610 can be prevented from occurring when anode current collecting plate 632 freely moves within case 620.

As shown in FIG. 7, bottom boss 627 protrudes above through hole 632a and is then inserted into the center of electrode assembly 610. As such, if bottom boss 627 is inserted into the center of electrode assembly 610, case 620 can stably support electrode assembly 610. With this structure, electrode assembly 610 is stably fixed to case 620 without freely moving within case 620.

Meanwhile, center pin 660 is inserted into the center of electrode assembly 610, and bottom boss 627 is inserted into center pin 660. That is, bottom boss 627 is inserted into the center of electrode assembly 610 through center pin 660.

According to the fifth exemplary embodiment, if center pin 660 is inserted into the center of electrode assembly 610, and bottom boss 627 is inserted into center pin 660, center pin 660 that is fixed to bottom boss 627 can stably support the entire electrode assembly 610.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

As described above, according to the principles of the exemplary embodiments of the present invention, since the bottom boss of the case is inserted into the opening of the anode current collecting plate, structural stability between the anode current collecting plate and the case can be secured.

The fixing boss formed in the anode current collecting plate is inserted into the center of the electrode assembly, thereby stably fixing the electrode assembly. Therefore, contact resistance can be reduced.

The bottom boss protrudes above the anode current collecting plate and is then inserted into the center of the electrode assembly, thereby stably fixing the electrode assembly. Therefore, contact resistance can be reduced.

The center pin is inserted into the bottom boss or the fixing boss and fixed, and the center pin fixes the entire electrode assembly. Therefore, structural stability and reliability of the rechargeable battery is improved.

The bottom recess and the support boss are formed, such that adjacent rechargeable batteries can be easily coupled with each other. Further, coupling stability is improved.

What is claimed is:

1. A rechargeable battery, comprising:
   an electrode assembly comprising a cathode, an anode, and a separator interposed between the cathode and the anode;
   a case accommodating the electrode assembly and including an opening through which the electrode assembly can be inserted and a bottom part opposite the opening, the case further including a bottom boss arranged at the bottom part of the case;

a cap assembly coupled to the opening of the case to close and seal the case and being electrically connected to the electrode assembly; and a current collecting plate arranged between the electrode assembly and the case and including an opening into which the bottom boss is inserted, with the opening in the current collecting plate being a fixing recess.

2. The rechargeable battery of claim 1, comprised of a fixing boss formed on a surface of the current collecting plate opposite to the fixing recess so as to be inserted into a center space of the electrode assembly.

3. The rechargeable battery of claim 1, comprised of a bottom recess formed on a surface of the bottom part of the case opposite to the bottom boss.

4. The rechargeable battery of claim 3, with the cap assembly comprising a cap plate comprised of:
an electrode terminal; and
a support boss to be inserted into a bottom recess of an adjacent rechargeable battery.

5. The rechargeable battery of claim 1, with the bottom boss having a solid structure with a bottom side of the bottom part of the case being flat and being absent a recess.

6. The rechargeable battery of claim 1, with the case having a cylindrical shape.

7. The rechargeable battery of claim 2, with the fixing boss having a cylindrical shape.

8. The rechargeable battery of claim 1, wherein the case has an outermost circumferential side extending from the opening to the bottom part, with a shape of the current collecting plate being the same as a transverse sectional shape of the case, and an external circumferential surface of the current collecting plate contacting an internal circumferential surface of the outermost circumferential side of the case.

9. The rechargeable battery of claim 1, further comprising a center pin arranged in a center space of the electrode assembly, wherein the current collecting plate includes a fixing boss arranged on a surface of the current collecting plate opposite the fixing recess, the fixing boss being inserted into the center pin.

10. A rechargeable battery, comprising:
an electrode assembly comprising a cathode, an anode, and a separator interposed between the cathode and the anode;
a case accommodating the electrode assembly and comprising a bottom part formed at a bottom part of the case;
a cap assembly coupled with the case to close and seal the case and being electrically connected to the electrode assembly;
a current collecting plate disposed between the electrode assembly and the case and comprising an opening into which the bottom boss is inserted, the opening being a fixing recess, wherein a fixing boss formed on a surface of the current collecting plate opposite to the fixing recess so as to be inserted into a center space of the electrode assembly; and a center pin inserted into the center space of the electrode assembly.

11. The rechargeable battery of claim 10, with the fixing boss being inserted into the center pin.

12. A rechargeable battery, comprising:
an electrode assembly comprising a cathode, an anode, and a separator interposed between the cathode and the anode, the electrode assembly being a wound electrode assembly having an empty space through a center thereof;
a case accommodating the electrode assembly and having an opening and a bottom part opposite the opening;
a cap assembly coupled to the case to close and seal the case, and being electrically connected to the electrode assembly; and
a current collecting plate arranged between the electrode assembly and the bottom part of the case, and comprising a fixing boss, which is inserted into the empty space at the center of the electrode assembly.

13. The rechargeable battery of claim 12, with the fixing boss having a rib shape with a rib formed around a circumferential surface of the fixing boss.

14. The rechargeable battery of claim 12, with the fixing boss having a solid structure where a bottom side of the current collector is flat at a location that corresponds to the fixing boss.

15. The rechargeable battery of claim 12, with the fixing boss having a cylindrical shape.

16. The rechargeable battery of claim 12, comprised of a center pin inserted into the empty space at the center of the electrode assembly, with the fixing boss of the current collecting plate being inserted into the center pin.

17. The rechargeable battery of claim 12, wherein the case has an outermost circumferential side extending from the opening to the bottom part, with an external circumferential surface of the current collecting plate being in contact with an internal circumferential surface of the outermost circumferential side of the case.

18. A rechargeable battery, comprising:
an electrode assembly comprising a cathode, an anode, and a separator interposed between the cathode and the anode, the electrode assembly being wound and having a space at a center thereof;
a case accommodating the electrode assembly and including an opening through which the electrode assembly can be inserted and a bottom part opposite the opening,
a cap assembly coupled to the opening of the case to close and seal the case and being electrically connected to the electrode assembly;
a current collecting plate arranged between the electrode assembly and the bottom part of the case and including a fixing boss on a top side thereof; and
a center pin arranged within the space at the center of the electrode assembly, the fixing boss being inserted into a bottom portion of the center pin.

19. The rechargeable battery of claim 18, the center pin being hollow to accommodate the fixing boss.

* * * * *